Feb. 3, 1953 A. N. GOLDSMITH 2,627,548
COLOR PHASING SYSTEM
Filed Sept. 10, 1949 2 SHEETS—SHEET 1

INVENTOR
Alfred N. Goldsmith
BY Philip G. Cooper
ATTORNEY

INVENTOR
Alfred N. Goldsmith
BY Philip H. Cooper
ATTORNEY

Patented Feb. 3, 1953 2,627,548

UNITED STATES PATENT OFFICE 2,627,548

COLOR PHASING SYSTEM

Alfred N. Goldsmith, New York, N. Y., assignor to Radio Corporation of America, a corporation of Delaware Application September 10, 1949, Serial No. 115,049

4 Claims. (Cl. 178—5.4)

This invention relates to means for maintaining a desired relation between the transmitted and received intelligence conveyed by a color-television system. It has for its principal object the provision of an improved apparatus and method of operation whereby a desired relation is maintained between the color-separation signals of the transmitter and the color component images produced by the receiver.

As is well known, there are sent from a color-television transmitting station a recurrent sequence of video signals. These signals each represent a different color-separation component of an element or a field or frame of the subject matter. Thus for each component there are transmitted different signals of a group number dependent on the number of selected colors and this number of signals is for each of the components. For purposes of illustration, it will be assumed that the selected colors are red, green and blue.

In the event that the color-television receiver utilizes the conventional color-disc or drum filter (or any equivalent electromechanical or electronic device) it is of course essential that the scanning of the red separation image at the receiver shall be effected by the red separation signal from the transmitter. This is also true of the green and blue images. It is therefor necessary that there be provided automatic means whereby some form of discriminating signal is sent from the transmitter which indicates the color of the scanned field and that there shall be at the receiver means whereby the corresponding color filter is placed between the originally reproduced image and the eye of the observer.

In accordance with the present invention, this result is accomplished by optical means, electromechanical means or electronic means. In the case of each of these different means, there is produced at the transmitter a signal which occurs at a pre-determined point in the scanning cycle and this signal is utilized at the receiver to insure that the color-selective element of the receiver corresponds to the proper color-separation signal.

Essentially the method herein disclosed utilizes at least one spot of a primary or component color corresponding to that of the image under transmission for use as an identifying signal. The spot of the color in question is so placed as to be invisible to the viewer of the received image. This is accomplished by placing the identifying component-color spot in that portion of the scanned rectangular image area which is masked off by the rounded corners of the picture as viewed at the receiver.

In one form of the invention, the identifying component-color spot is produced by means of a small light beam which is projected to the photoelectric mosaic of the camera through the same color disc as the image of the subject matter to be transmitted. Alternatively this small light beam may be projected to the mosaic of the camera through a separate color disc.

In another form of the invention, the outputs of the field deflection and line deflection generators are combined in a manner to produce a voltage which is applied to the control grid of the camera and may be controlled to intensify its cathode ray at any desired point in the scanning cycle.

In a further form of the invention, commutators rotating respectively at frame and line frequencies are utilized to provide a signal at the desired point in the scanning cycle. Like the signal produced by the identifying light spot, previously mentioned, this signal is transmitted with the video signals and is utilized at the receiver to effect proper color phasing between the video signals and the observed images at the receiver.

The invention will be better understood from the following description considered in connection with the accompanying drawings and its scope is indicated by the appended claims.

Referring to the drawings:

Figure 1 indicates the usual rectangular scanning field at a transmitter or receiver and shows the observed field as defined by a mask having rounded corners at its inner periphery.

As will appear, parts of the transmitter and receiver which are conventional in the art are shown in the form of boxes bearing explanatory legends.

Figure 1:
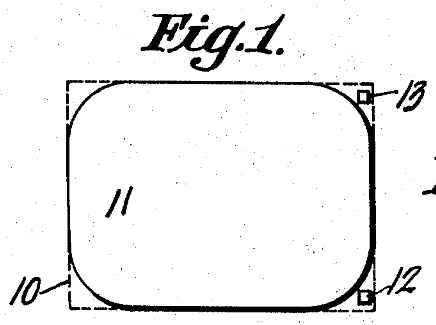
Figure 8:
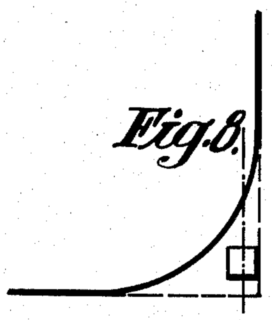
Figure 8 illustrates on an enlarged scale one corner of the scanned field and the mask of Figure 1.

In Figures 1 and 8 the usual rectangular scanning field is indicated by the dotted lines 10. This field is masked so that only that part of it within the full line 11 is exposed. As indicated at 12 and 13, the color-component spots for producing the identifying or color-phasing signal are produced in an area of the scanning field which is covered by the mask.

Figure 2:
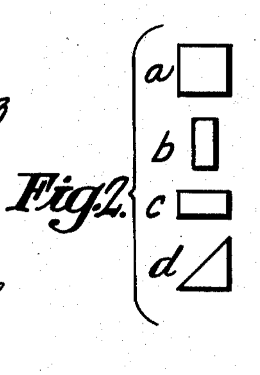
Figure 2 illustrates different forms of identifying spots which are produced in the masked corners of the scanning field.

These spots may be of any suitable form such as those shown by (a), (b), (c) and (d) of Figure 2, for examples, and they may occur in only a single corner of the image, or in several corners.

Figure 3:
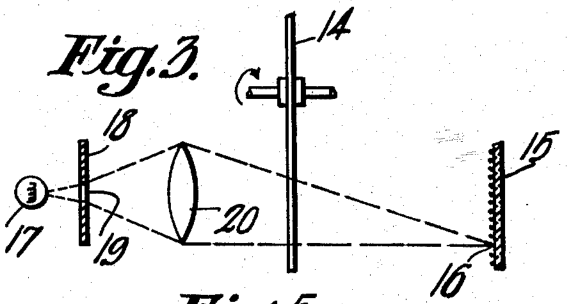
Figure 3 illustrates a form of the invention wherein the identifying color-component spot is produced by a small beam of light transmitted to the camera mosaic through the same color disc as the image of the subject matter to be transmitted.

Figure 3 shows one arrangement suitable for producing these color-components spots. In this figure, are shown a color disc 14 and a part of the mosaic 15 of the television transmitter camera. An image of the subject matter to be transmitted (not shown) is projected through the upper part of the disc 14 to the mosaic 15 in a manner now conventional in the art. The color-component spot is produced at a point 16 of the mosaic 15 by means including a light source 17 which emits light through a mask 18 having a small aperture 19. The beam thus formed is projected through the lower part of the disc 14 and a lens 20 to the point 16 of the mosaic. The light projected through the lens 20 and the disc 14 may be made to have the same color as that applied through the upper part of the disc.

In this purely optical method of creating the color spot, it is clear that this bright spot of color will drown out any other colors in the corner of the image and will impress a color signal of full brightness, and of corresponding component color of that field, upon the modulator of the color-television transmitter as that portion of the mosaic is scanned.

Figure 4:
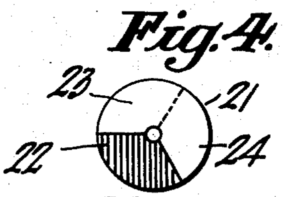
Figure 4 illustrates a form of color disc which may be utilized separately from the color disc through which the image of the subject matter is projected to the mosaic of the camera.

As indicated by Figure 4, the light beam applied to the point 16 of the mosaic 15 may be projected through a separate color disc 21 instead of through the disc 14. In this case, the disc 21 is rotated simultaneously with the disc 14 and in color phase therewith. Thus it may have one color sector 22 (e. g. red), and sectors 23 and 24 which are opaque.

Figure 5:
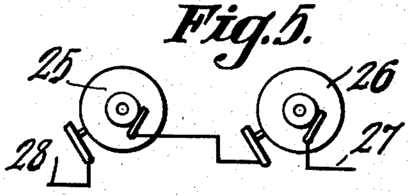
Figure 5 illustrates a pair of commutators which are rotated at frame and line speeds respectively for producing a signal at a selected point in the scanning cycle.

Figure 5 illustrates an electromechanical form of device adapted to produce the color-phasing signal at the point 16 of the mosaic 15 of Figure 3. This device includes one commutator 25 which is rotated at frame frequency and another commutator 26 which is rotated at line frequency. When the narrow conductive segments of these two commutators simultaneously engage their cooperating brushes, an electrical pulse from a source (not shown) is transmitted from a lead 27 through the commutators and a lead 28 to produce a color-phasing signal which is utilized as previously indicated. The two commutators are conductive only during the time when the video signal is derived from a portion of the image area near one of its corners. In this case, the identifying or color-phasing spot is not produced at the point 16 but its electrical effect is duplicated.

Figure 6:
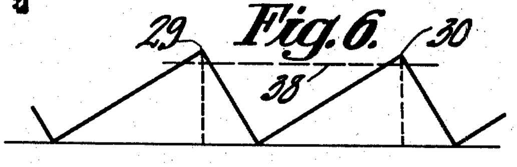
Figures 6 and 7 illustrates a form of the invention wherein the outputs of the field and line deflection generators are combined in a manner to vary the intensity of the camera beam at a predetermined point or points in the scanning cycle.

Figure 6 shows the conventional field deflection wave of a television transmitter. A small section of the wave near peaks 29 and 30 corresponds to the scanning of one corner of the image.

Figure 7:
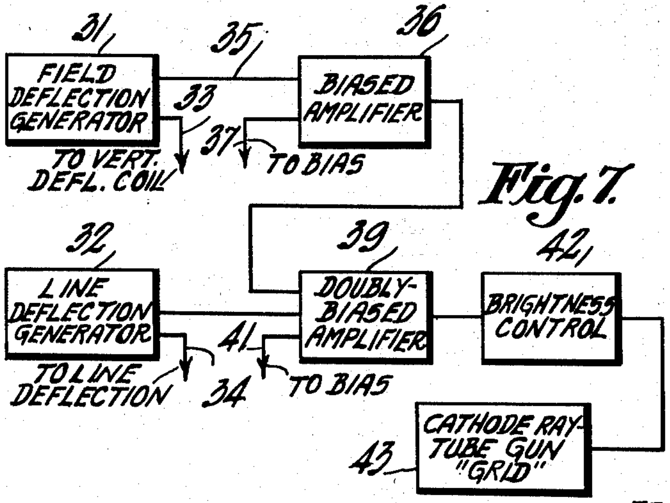

Figure 7 illustrates a circuit adapted to vary the intensity of the cathode ray of the camera at one corner of the scanned field. This circuit includes a field deflection generator 31 which delivers an output wave similar to that of Figure 6. A similar wave of higher frequency is produced at the output of a line deflection generator 32. Output from the generators 31 and 32 is supplied through leads 33 and 34 respectively to the field and line deflection systems of the transmitter camera. Through a lead 35 output is also supplied from the generator 31 to an amplifier 36 which has applied to its input lead 37 a voltage such that it is biased on only when the output voltage of the generator 31 is above the level indicated by the line 38 of Figure 6.

The amplifier 36 delivers its output to the input of an amplifier 39. The input of this amplifier 39 also is connected (1) through a lead 40 to the output of the line deflection generator 32 and (2) through a lead 41 to a source of bias voltage having a value such that the amplifier 39 conducts only near the peaks of the line deflection voltage. Under these conditions, the output voltage of the amplifier 39 is increased only in the corresponding portions of both the field deflection wave and the line deflection wave.

The output voltage of the amplifier 39 is applied through a brightness control circuit 42 of conventional form to the grid of the transmitter camera which is indicated in Figure 7 by the reference numeral 43. As a result, the beam current of the camera 43 is changed in a manner to cause a full-output component-color signal at selected points in the scanning cycle, regardless of the image showing on the mosaic at that point.

Figure 9:
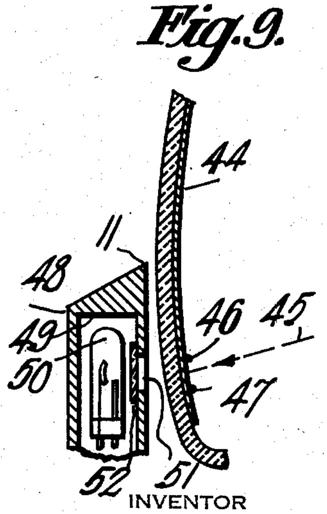
Figure 9 illustrates how the transmitted identifying signal is utilized in the image tube of the receiver.

Figure 9 indicates how the component-color-phasing signal, produced as indicated above, may be utilized at the receiver to insure proper phasing between such signals and the reproduced images of the transmitted subject matter. This figure shows one corner of the image tube which may be of any of the suitable forms conventional in the art. The image tube is illustrated as having at one of its ends a fluorescent screen 44 to which a scanning beam 45 is applied. The spot produced on the screen 43 by the color-phasing signal is indicated at 46—47. In front of the screen 44 is mounted a mask 48 having the inside periphery 11 of Figure 1 and having a cavity 49 within which is mounted a light responsive tube 50. Interposed between the tube 50 and the spot 46—47 is an aperture 51. A filter 52 having a color corresponding to the color-phasing signal transmitted through the beam 45 to the spot 46—47 may be mounted so as to cover the aperture 51.

It will be noted that the tube 50 is nested within the masking framework over the kinescope or image reproducing tube and is invisible to the observer. The output of the tube 50 is utilized to control the color phasing device by whatever means are suitable for the particular type of receiver which is used.

Figure 10:
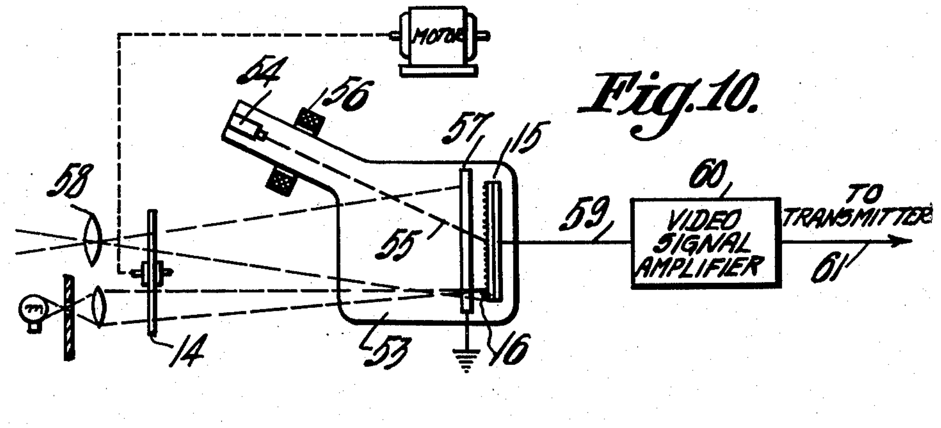
Figure 10 illustrates the relation between various parts of the television transmitter.
Figure 11:
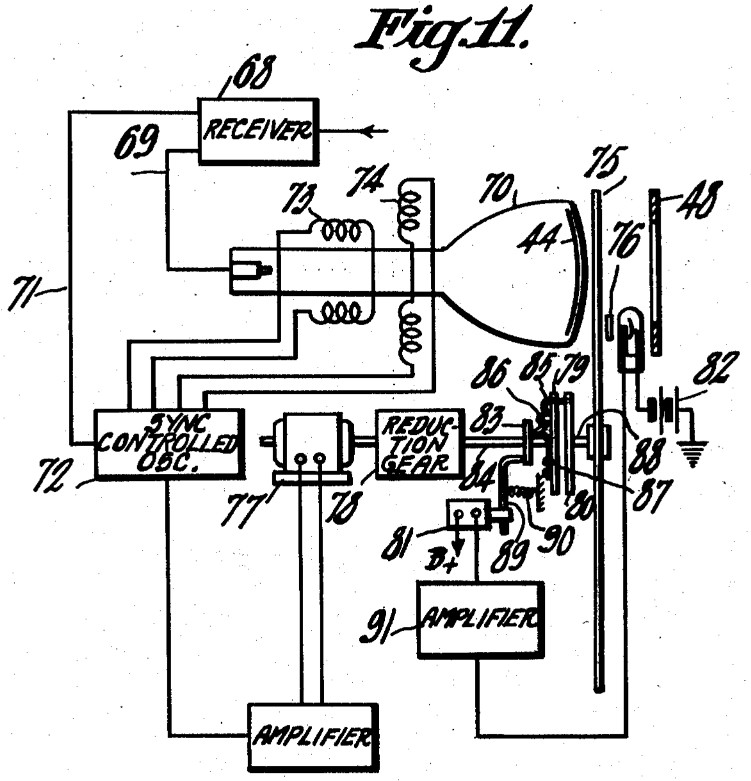
Figure 11 illustrates the relation between the various parts of the receiver.

Figure 10 illustrates in a general way one possible relation between the various parts of a color-television transmitter. This transmitter includes a camera 53 which includes (1) an electron gun 54 for producing an electron beam indicated by a broken line 55, (2) the mosaic or target electrode 15, (3) deflector coils 56 for causing the beam to scan the mosaic 15 in a well known manner, and (4) an electrode 57 for collecting the electrons released from the mosaic.

An image of the subject matter to be transmitted (not shown) is projected through a lens 58 and the color disc 14 to the mosaic 15. The speed of the disc 14 and the scanning frequency are so related that the mosaic 15 is scanned once for each color filter interposed between the subject matter and the mosaic. As a result, there are produced at the output lead 59 of the camera signals each of which is representative of a different component-color of the subject matter.

At the point 16 in each scanning cycle, there is also produced a color-phasing signal which is also made available at the output lead 59.

These video and color-phasing signals are amplified by an amplifier 60 and supplied through a lead 61 to a transmitter (not shown).

The radiated signals are received by an antenna (not shown) from which they pass through conventional circuits to a receiver 68 wherein the video and color phasing signals are separated from the synchronizing signals. From the receiver 68, video signals pass through a lead 69 to the control grid of the image tube or reproducer 70. The synchronizing signals are supplied through a lead 71, to an oscillator 72 which has its output connected to the bi-directional scanning coils 73—74 by which the electron beam of the image reproducer 70 is made to scan the fluorescent screen 44.

As pointed out in connection with Figure 9, the screen 44 is masked by a member 48 having at one of its corners a cavity within which is nested the photoelectric cell 50. The images appearing on the exposed area of the screen 44 are projected through a color disc 75 to the eye of the observer.

Between the fluorescent screen 44 and the photocell 50 is interposed a color filter 76 which is selective to the color corresponding to the transmitted phasing signal.

Rotation of the disc 75 is effected by a motor 77 in a manner similar to that disclosed by a patent of G. L. Beers, 2,378,746. The motor 77 is mechanically coupled to the disc 75 through a reduction gear 78 and a clutch 79—80. This clutch is controlled by a solenoid 81 which is energized by a source 82 and an associated amplifier 91 when the spot 16 is illuminated and the position of the disc 75 is such as to pass the light selected by the filter 76. For example, if the filter 76 transmits red light, the solenoid 81 is energized when (1) the red sector of the disc 75 is aligned with the filter and (2) the spot 16 is illuminated. If the red sector of the disc 75 is not aligned with the filter when the spot 16 is illuminated, the current of the photocell 50 is reduced and the solenoid 81 is deenergized.

Associated with the clutch members 79 and 80 are a collar 83 which is movable along the shaft 84 and a dog 85 which is pivoted at 86 and is biased to its illustrated position by a spring 87. In this position, the dog 85 engages one or another depression in the plate 80 so as to lock the shafts 84 and 88 in any one of the different positions corresponding to the differently colored sectors of the disc 75.

The position of the collar 83 along the shaft 84 is determined by a member 89 which is biased to the right by a spring 90 but is maintained in its illustrated position so long as the red sector of the disc 75 comes into alignment with the filter 76 while the spot 16 is illuminated. When this condition does not exist, however, the solenoid 81 is deenergized, the collar 83 and member 89 are moved to the right by the spring 90 and the dog 85 is operated to disengage the plates 79 and 80 so that the plate 80 slips until proper color phasing is effected.

What the invention provides is an improved color phasing system which functions during the scanning of an unobserved area of the scanned field to produce a signal which is utilized at the receiver for maintaining a desired relation between component colors of the transmitted subject matter and its reproduced image.

I claim as my invention:

1. In a color television system utilizing color separation images and in which portions of the reproduced image at the receiver are normally masked from view, means for producing a desired phase relation between the transmitted and reproduced color separation images comprising in combination means at the transmitter for producing color phasing pulses, means adding said pulses to the transmitted signal train at periods corresponding to time intervals during which the scanning beam is scanning one of said portions masked from view, means at the receiver utilizing said color phasing signals to activate the receiver mosaic at at a corresponding one of said masked portions, means also at the receiver for adjusting said phase relation, and color sensitive means responsive to the activation of said masked portion for operating said phase adjusting means to establish said desired relation.

2. A color television system in accordance with claim 1 in which said color phasing pulse producing means comprises an optical system arranged to saturate a portion of the image mosaic corresponding to one of said masked portions with light of a single color component.

3. A color television system in accordance with claim 1 in which said color phasing pulse producing means comprises a source of vertical deflection voltages, a source of horizontal deflection voltages, means combining said voltages so as to produce a control voltage when the peaks of said deflection voltages coincide, and means utilizing said control voltage to produce said color phasing signals.

4. A color television system in accordance with claim 1 in which said color phasing pulse producing means comprises a commutator operating in synchronism with the horizontal scanning, a second commutator operating in synchronism with the horizontal scanning, said commutators being connected in series, a source of potential connected to said commutators, and means for deriving from said source and said commutators said color phasing signals.

ALFRED N. GOLDSMITH.

REFERENCES CITED

The following references are of record in the file of this patent:

UNITED STATES PATENTS

| Number | Name | Date |
|---|---|---|
| 2,309,506 | Herbst | Jan. 26, 1943 |
| 2,319,789 | Chambers | May 25, 1943 |
| 2,378,746 | Beers | June 19, 1945 |
| 2,389,979 | Huffnagle | Nov. 27, 1945 |
| 2,530,431 | Huffman | Nov. 21, 1950 |